United States Patent [19]

Kondo et al.

[11] Patent Number: 4,777,095

[45] Date of Patent: Oct. 11, 1988

[54] CHILLED BEEF PACKAGING FILM

[75] Inventors: Kazuo Kondo; Nobuya Ishiguro; Teruo Tada, all of Marugame, Japan

[73] Assignee: Okura Industrial Co., Ltd., Kagawa, Japan

[21] Appl. No.: 906,046

[22] Filed: Sep. 11, 1986

[30] Foreign Application Priority Data

Sep. 25, 1985 [JP] Japan .................. 60-213152
Sep. 30, 1985 [JP] Japan .................. 60-218850

[51] Int. Cl.$^4$ .................. B32B 27/28; B65D 65/40
[52] U.S. Cl. .................. 428/476.1; 428/516; 428/520; 264/176.1; 426/127
[58] Field of Search .................. 428/476.1, 516, 520

[56] References Cited

U.S. PATENT DOCUMENTS

| | | | |
|---|---|---|---|
| 4,207,363 | 6/1980 | Lustig et al. | 428/517 |
| 4,472,485 | 5/1986 | Tabuse et al. | 428/520 |
| 4,588,648 | 5/1986 | Krueger et al. | 428/476.1 |
| 4,612,221 | 9/1986 | Biel et al. | 428/476.1 |

FOREIGN PATENT DOCUMENTS 0212261 12/1984 Japan .................. 428/476.1

*Primary Examiner*—P. C. Ives
*Attorney, Agent, or Firm*—Armstrong, Nikaido, Marmelstein & Kubovcik

[57] ABSTRACT

A composite film suitable for shrink-packaging bony cut meat, including at least one oxygen-impermeable layer, and at least one heat sealable, surface layer formed of a thermoplastic resin, said film having the following physical properties:

$$C_L \geq 15$$
$$C_T \geq 15$$
$$80 \leq S_L \leq 250$$
$$80 \leq S_T \leq 250$$
$$T \geq 1.2 S_L + 60$$
$$T \geq 1.2 S_T + 60$$

wherein $C_L$ and $C_T$ represent the thermal contraction percentages (%) of the film measured in 90° C. hot water in the longitudinal and transverse directions, respectively, $S_L$ and $S_T$ represent the thermal contraction stresses (g/cm) of the film measured in 90° C. hot water in the longitudinal and transverse directions, respectively, and T represents the piercing strength (g) of the film measured in 90° C. hot water.

9 Claims, No Drawings

CHILLED BEEF PACKAGING FILM

BACKGROUND OF THE INVENTION

This invention relates generally to a shrink package for fresh meat parts, and more specifically to a chilled beef packaging film especially suitable for use in shrink packaging of bony cut meat.

Heretofore, fresh meat has been transported to butcher shops mostly in the form of whole pieces. However, it has become the usual practice to cut it into parts at a slaughterhouse and to deliver the cut meat to butcher shops in shrink packages wrapping the cut meat parts in an oxygen-impermeable, thermally shrinkable film and chilled to a temperature of about zero degree centigrade.

When shrink packaging bony meat parts with currently available chilled beef packaging films, troubles are often encountered because the packaging film is liable to be pierced and ruptured by sharp-point bones in the stage of thermal shrinkage. In order to avoid this trouble, the so called "bone guard" which is impregnated with paraffin or the like is covered on an exposed bone portion of a cut meat to be shrink packaged. However, it is still unsatisfactory and cannot completely prevent the rupturing of the film in the shrinking stage. In addition, the use of "bone guards" for covering the bone portions is reflected by a substantial increase in packaging cost.

SUMMARY OF THE INVENTION

It is an object of the present invention to provide a chilled beef packaging film which can shrink package bony meat parts at a low cost without resorting to "bone guards". It is another object of the present invention to provide a chilled beef packaging film which can produce shrink packages which are satisfactory in tightness and appearance as well as in preservability of contents.

The breakage of a chilled beef packaging film in the shrinking stage of a shrink packaging process is considered to be caused mostly by a sharp pointed portion of a bone piercing through the thermally shrinking film. This breakage of film is closely related with factors such as thermal contraction percentage, thermal contraction stress and piercing strength of the film. More specifically, in view of the fact that the shrink package of meat parts is effected by spraying hot water of 90° C. for about 3 seconds, the above-mentioned factors should be considered as thermal contraction percentage and stress by contact with hot water of 90° C. and a piercing strength in hot water of 90° C.

Namely, the breakage of thermally shrinkable package films by sharp-pointed bone portions can be reduced by the use of a packaging film with a high piercing strength or of course by the use of a film with a smaller thermal contraction percentage or stress. However, shrink packages enclosing meat parts in a film of a small thermal contraction percentage or stress are inferior in tightness. A package which is inferior in tightness has an extremely low commercial value because it is poor in appearance and apt to make a pool of exuded meat juice.

In an attempt to prevent the breakage of a film by a sharp bone edge in the shrink packaging process for wrapping bony cut meat in the film while ensuring excellent tightness of the shrink package, an intensive study has been made with respect to the relationship between the thermal contraction percentage and stress, and the piercing strength.

As a result, it has been revealed that the chilled beef packaging film meeting with the following criteria can be suitably used as a shrink packaging film:

(a) The thermal contraction percentages C (%) must be at least 15% in both longitudinal and transverse directions when measured in hot water of 90° C.;

(b) The thermal contraction stresses S (g/cm) must be 80 g/cm or more but must not exceed 250 g/cm in both longitudinal and transverse directions; and (c) The piercing strength T (g) must satisfy the following conditions in both longitudinal and transverse directions:

$$T \geq 1.2S + 60$$

The term "longitudinal direction" used herein is intended to refer to so-called "machine direction" (M. D.) which is parallel with the direction along which the film has been manufactured, while the term "transverse direction" is intended to mean a direction (T. D.) perpendicular to the "longitudinal direction".

For the purpose of the present specification, the thermal contraction percentage, thermal contraction stress and piercing strength are measured by the following methods.

The thermal contraction percentage is determined by cutting from the film a square sample of $100 \times 100$ mm, and shrinking the sample by immersing same in 90° C. hot water for about 3 seconds. The length of the sample in each of the longitudinal and transverse directions is measured to calculate the thermal shrinkage percentage in each direction according to the following equation:

$$C = [(100 - L')/100] \times 100 \text{ (\%)}$$

wherein C represents the thermal shrinkage percentage of the film in the longitudinal or transverse direction and L' represents the length of the sample in the longitudinal or transverse direction after shrinkage.

For measuring the thermal contraction stress, the film is cut to obtain two kinds of strips having 10 mm width and extending perpendicularly to each other. Each specimen is gripped by a pair of spaced apart chucks (distance: 40 mm) in a manner so that the specimen is held in unloaded and slackening-free state and is prevented from being contracted. The specimen supported by the chucks is then immersed in 90° C. hot water for 3 seconds to measure the maximum stress (g/cm) between the chucks, representing the thermal contraction stress.

The piercing strength is measured by fixing a specimen of the film on a ring with an inner diameter of 25 mm in a slackening-free state, followed by immersion in 90° C. hot water. A rod-like steel punch having a diameter of 10 mm and a pointed end with an angle of 53° and a radius of curvature of 0.3 mm is driven toward the specimen at a speed of 100 mm/min, while measuring the load applied thereto. The maximum load (g) at which the specimen is broken represents the piercing strength.

DETAILED DESCRIPTION OF THE INVENTION

It is essential that chilled beef packaging film of the present invention should have an excellent oxygen-blocking property for ensuring preservability of package contents. A laminated film at least one layer of which is formed of a thermoplastic resin with excellent oxygen blocking property can meet with this criterion. As for the oxygen-blocking layer, it is preferable to use a polyamide resin because of its good piercing strength and oxygen-blocking property. The use of a copolymer of nylon-6 and nylon-66 is especially preferred for further reasons of its excellent thermal shrinkability. Further, where a higher degree of oxygen blocking property is required, it is recommended to laminate a layer of a saponified ethylene-vinyl acetate copolymer on the polyamide resin layer. The saponified ethylene-vinyl acetate copolymer preferably has an ethylene content of 25 to 50 mol % and a degree of saponification of at least 95% with respect to vinyl acetate units in the copolymer. The thickness of the oxygen-impermeable layer is generally 10-50 μm.

Further, it is important that the chilled beef packaging film should be able to be formed in to bags or casings. For this purpose, at least one of the two surface layers of the film should be of a heat-sealable, thermoplastic resin. The heat sealable thermoplastic resin may be, for example, a polyethylene resin, a polypropylene resin or an ethylene-vinyl acetate copolymer resin. These heat-sealable resins may be modified by graft compolymerization of a polar group component thereonto so as to facilitate melt-bonding with a polyamide resin or a saponified ethylene-vinyl acetate copolymer in a co-extrusion film forming process. From a standpoint of miscellaneous sealbility, it is preferred to use an inomer resin.

Furthermore, to prevent film breakage due to vibrations during transportations of shrink packages containing bony meat parts and packed in boxes of corrugated board and to guarantee excellent fit of the film on the packed meat, it is preferred that the heat-sealable layer be composed of 90-50 wt % of a polyethylene resin with a density of 0.915-0.945g/cm and 10-50 wt % of an olefinic rubber such as an ethyelene-α-olefin random copolymer rubber with an ethylene content of 60-95 mol %, an ethyelene-1-butene random copolymer rubber or a mixture thereof. If the density of the polyethylene resin is in the above-defined range, there will be no possibility of the film breakage due to vibrations during transportation. On the other hand, if the additive amount of the olefinic rubber composition is in the specified range, excellent fitness of the film on the packed meat can be ensured without degrading the property of resisting vibrational breakage. The thickness of the heat sealable, surface layer is generally 20-100 μm.

The thus constructed laminate film should have abovespecified thermal contraction percentage, thermal contraction stress and piercing strength. These requirements will be described in more detail below.

With regard to a bag of the chilled beef packaging film, it is necessary to make the inside diameter of the bag larger than the outer diameter of meat part to be packaged in order to facilitate the job of inserting the meat part into the bag. In order to package the meat part tightly in the slightly larger bag by shrinking the film in sprays of hot water after insertion of the meat part, the film should possess at least 15% of thermal contraction percentage in both longitudinal and transverse directions. The use of a film with a thermal contraction percentage of less than 15% necessitated the use of a small bag in order to ensure tightness of the ultimate shrink package. In this case, however, it is impossible to give a sufficient margin to the inside diameter of the bag relative to the outer diameter of the meat part so that the efficiency of the meat inserting operation is lowered.

In addition to the above-mentioned thermal contraction percentage, the thermal contraction stress is also an important factor to provide tightness of the shrink package. Namely, even when a film with a thermal contraction percentage of 15% or more is used, the tightness of the ultimate shrink package is still insufficient if the thermal contraction stress is low. In order to obtain a satisfactory tightness using such a film, it is required to use a bag of a small size. This causes a problem of lowering of the packaging operation efficiency as described above. On the other hand, an excessively strong thermal contraction stress will cause breakage at seal portions of the package in the shrinking stage if the bag used has a size suitable for efficient inserting operation. That is to say, since the seal strength is lowered upon contact with hot water sprays, the seal portions of the package fail to withstand the thermal cntraction stress exerted during the thermal shrinking stage. For the above reasons, the thermal contraction stress of the film should be 80 g/cm or more but should be 250 g/cm or less.

A film with the above-mentioned thermal contraction percentage and stress can produce shrink packages of satisfactory quality when used for boneless meat parts. In shrink packaging of bony meat parts, however, such a film still encounters a problem of breakage due to sharp bone edges. That is, a sharp pointed portion of bones pierces and ruptures the packaging film during thermal shrinking stage. It has been found that the film breakage does not occur if bony meat parts are shrink packaged in a film which satisfies, in addition to the above-described criteria with respect to the thermal contraction percentage and stress, the following condition in both longitudinal and transverse directions thereof:

$$T \geq 1.2 S60$$

where T and S stand for the piercing strength (g) and thermal contraction stress (g/cm) of the film, respectively.

The physical properties of the film can be controlled in various manners. For instance, a film with a desired thermal contraction percentage can be obtained by selecting suitable stretching rate and conditions or suitable thermal fixing conditions in the manufacturing process of the film. The thermal contraction percentage is also varied with the kind of the resin used and the film thickness.

Similar to the thermal contraction percentage, the thermal contraction stress can be controlled by varying stretching rate, stretching conditions and thermal fixing conditions. Since the thermal shrinkage of the film as generally effected in sprays of hot water, the thermal contraction stress is influenced not only by the kind of the resin and film thickness but also by the kind of the resin used for the surface layer of the film.

The piercing strength can be controlled by selecting suitable stretching conditions, thermal fixing conditions and film thickness. The arrangement of the film layers also has a great influence upon the piercing strength. Namely, films having the same resin layers will give different piercing strengths depending upon the layer arrangement.

Although there are no particular restrictions on the method for producing the chilled beef packaging film according to the invention, it is preferred to employ the following method for reasons of providing films of satisfactory quality by simple procedures. Thus, it is preferred to co-extrude a multi-layered sheet by the use of a multi-layer die operated by a plural number of extruders. After cooling for solidification, the multi-layered sheet is re-heated up to a suitable streching temperature, followed by stretching at a rate of 200% or more in both longitudinal and transverse directions. The stretching may be effected either by a tender method or by an inflation method. The latter method is preferred since it is desirable to form tubular films for the formation of bags and since it is easier to impart the same thermal shrink properties to the film in both longitudinal and transverse directions thereof. In this connection, it is to be noted that the laminated film formed by the co-extruding and stretching operations undergoes deformations or deteriorations in surface conditions due to spontaneous shrinkage of the film when left as it is for a certain period of time. Therefore, the film is desirably thermally treated after stretching in such a manner as not to lower its thermal shrinkability to any substantial degree for the purpose of reducing the extent of spontaneous shrinkage.

The total thickness of the chilled beef packaging film according to the present invention is determined in relation with the thermal contraction stress and piercing strength, but is generally in the range of 40–150 μm.

With regard to the method of shrink packaging a meat part with the use of the film according to the present invention, it is preferred to employ a method including the steps of: providing a bag made from the film having a size fitted for receiving the meat part, inserting the meat part in the bag, evacuating the interior of the bag, heat-sealing the open end of the bag, spraying over the resulting package hot water of 90° C. for 3 seconds to shrink the packaging film, and spraying cold water immediately thereafter.

The following examples and comparative examples will further illustrate the present invention.

EXAMPLE 1

A polyamide resin (AMILAN CM-6041, a copolyer of Nylon-6 and Nylon-66, produced by Toray Industries, Inc.), a modified polyethylene resin (NOVATEC AP-220 L, a product of Mitsubishi Chemical Industries Ltd.) and a polyetheylene resin (SUMIKASEN F-208, a low density polyethylene, produced by Sumitomo Chemical Co., Ltd.) were extruded by the use of a triple layer die to obtain a laminated, non-stretched tube having an outer layer of the polyamide resin, an intermediate layer of the modified polyethylene resin and an inner layer of the polyethylene resin. The tube was then stretched at a rate of about 300% in both longitudinal and transverse directions by the conventional biaxial inflation method and, thereafter, heat treated to obtain a chilled beef packaging film composed of outer, intermediate and inner layers with thicknesses of 15, 5 and 30 μm, respectively.

The film thus obtained was formed into bags and used for vacuum packaging of bony meat parts each weighing 10 kg without using any "bone guard". After spraying 90° C. hot water for 3 seconds, the resulting shrink packages were cooled by spraying cold water. The bags had an inside diameter suitable for receiving the bony meat. The resulting shrink packages were found to undergo no film breakage by a sharp pointed portion of the bone, to be almost free of pools of meat juice and to have satisfactory quality and excellent tightness. Besides, the shrink packages exhibited excellent preservability of the content.

The rates of thermal shrinkage of the packaging film in longitudinal and transverse directions were 24% and 26% respectively, when measured in 90° C. hot water. The values of longitudinal and transverse thermal contraction stress in 90° C. hot water were 105 g/cm and 122 g/cm, respectively. Further, the piercing strength in 90° C. hot water was 260 g.

EXAMPLE 2

A polyamide resin (AMILAN CM-6041, a copolymer of Nylon-6 and Nylon-66, produced by Toray Industries, Inc.), a saponified ethylene-vinyl acetate copolymer (SOANOL ET, ethylene content 38 mol %, saponification degree 98%, produced by Nippon Synthetic Chemical Industries Co., Ltd.), a modified ethylene-vinyl acetate copolymer resin (NOVATEC AX-112E, produced by Mitsubishi Chemical Industries Ltd.) and an etheylene-vinyl acetate copolymer resin (EVATATE CXV-039, produced by Sumitomo Chemical Co., Ltd.) were extruded by the use of a quadrilayer die to obtain a laminated, non-stretched tube having a polyamide resin layer, a saponified ethylene-vinyl acetate copolymer layer, a modified ethylene-vinyl acetate resin layer and an ethylene-vinyl acetate layer which were arranged in that order from the outermost to innermost side. The tube was then stretched at a rate of about 300% in both longitudinal and transverse directions by the conventional bi-axial inflation method and, thereafter, heat treated to obtain a chilled beef packaging film composed of four layers with thicknesses of, from the ourtermost side, 20, 10, 10 and 30 μm, respectively.

Bony meat parts each weighing 10 kg were shrink packaged without using any "bone guard" in the same manner as described in Example 1 using the thus obtained film. The resulting shrink packages were found to undergo no film breakage by a sharp pointed portion of the bone, to be almost free of pools of meat juice and to have satisfactory quality and excellent tightness. Besides, the shrink packages exhibited superior preservability of the content in comparison with that in Example 1.

The rates of thermal shrinkage of the packaging film in longitudinal and transverse directions were 25% and 28%, respectively, when measured in 90° C. hot water. The values of longitudinal and transverse thermal contraction stress in 90° C. hot water were 140 g/cm and 152 g/cm, respectively. Further, the piercing strength in 90° C. hot water was 340 g.

EXAMPLE 3

A polyamide resin (AMILAN CM-6041, a copolymer of Nylon-6 and Nylon-66, produced by Toray Industries, Inc.), and a mixture of a modified polyethylene resin (ADMER NF-550, produced by Mitsui Petrochemical Industries, Ltd.) and a polyethylene resin (ULTZEX 2021F, straight chain low density polyethylene, produced by Mitsui Petrochemical Industries, Ltd.) were extruded by the use of a triple layer die to obtain a laminated, non-stretched tube having a mixed resin layer, a polyamide resin layer and a mixed resin layer which were arranged in that order from the outermost to innermost side. The tube was then stretched at a rate of about 300% in both longitudinal and transverse directions by the conventional bi-axial inflation method and, thereafter, heat treated to obtain a chilled beef packaging film composed of three layers each with a thickness of 20 μm.

Bony meat parts each weighing 10 kg were shrink packaged without using any "bone guard" in the same manner as described in Example 1 using the thus obtained film. The resulting shrink packages were found to undergo no film breakage by a sharp pointed portion of the bone even when the bags used had insufficient inside diameter for inserting the meat part and a certain difficulty was encountered during the insertion step. The packages had an excellent tightness and exhibited excellent preservability of the content.

The rates of thermal shrinkage of the packaging film in longitudinal and transverse directions were 26% and 30%, respectively, when measured in 90° C. hot water. The values of longitudinal and transverse thermal contraction stress in 90° C. hot water were 138 g/cm and 152 g/cm, respectively. Further, the piercing strength in 90° C. hot water was 720 g.

EXAMPLE 4

A polyamide resin (AMILAN CM-6041, a copolymer of Nylon-6 and Nylon-66, produced by Toray Inudstries Inc.), and a modified polyethylene resin (ADMER NF-550, produced by Mitsui Petrochemical Industries, Ltd.) and a mixture of 75 weight % of a polyethylene resin (ULTZEX 2021F, density 0.920 g/cm³, produced by Mitsui Petrochemical Industries, Ltd.) and 25 weight % of an ethylene-α-olefin random copolymer rubber (TAFMER A-4085, ethylene content of about 80 mol %, produced by Mitsui Petrochemical Industries, Ltd.) were extruded by the use of a triple layer die to obtain a laminated, non-stretched tube having a polyamide resin layer, a modified polyethylene resin layer and a mixed resin layer which were arranged in that order from the outermost to innermost side. The tube was then stretched at a rate of about 300% in both longitudinal and transverse directions by the conventional bi-axial inflation method and, thereafter, heat treated to obtain a chilled beef packaging film composed of three layers with thicknesses of, from the outermost side, 15, 10 and 35 μm, respectively.

Bony meat parts each weighing 10 kg were shrink packaged with and without using any "bone guard" in the same manner as described in Example 1 using the thus obtained film. The two kinds of the resulting shrink packages were found to undergo no film breakage by a sharp pointed portion of the bone. The packages using the bone guards were packed in a corrugated fiberboard carton and transported in a distance of about 600 Km by a refrigerative van while being kept at −2° to 2° C. No breakage was observed in any of the packages after the transportation. All the packages after the transportation exhibited good fitness between the film and the content. The rates of thermal shrinkage of the packaging film in longitudinal and transverse directions were 26% and 27%, respectively, when measured in 90° C. hot water. The values of longitudinal and transverse thermal contraction stress in 90° C. hot water were 126 g/cm and 138 g/cm, respectively. Further, the piercing strength in 90° C. hot water was 580 g.

COMPARATIVE EXAMPLE 1

A thermally contractive film having a thickness of 20 μm and formed of Nylon-6 (AMILAN CM1021, produced by Toray Industries, Inc.) and a film having a thickness of 30 μm and formed of a polypropylene resin (NOBLENE FS-6311, produced by Sumitomo Chemical Co., Ltd) were laminated by a conventional dry laminate method to obtain a chilled beef packaging film. Using the thus obtained laminated film, bony meat parts each weighing about 10 kg were vacuum packaged in the same manner as in Example 1. When the bags of the film had an inner diameter slightly larger than the meat part and suitable for inserting the meat part thereinto, the resulting packages had poor tightness due to the insufficient shrinkage of the film. Further, meat juice pools were significantly formed.

The rates of thermal shrinkage of the packaging film in longitudinal and transverse directions were 11% and 13%, respectively, when measured in 90° C. hot water. The values of longitudinal and transverse thermal contraction stress in 90° C. hot water were 112 g/cm and 126 g/cm, respectively. Further, the piercing strength in 90° C. hot water was 440 g. Thus the film satisfies all the above-specified criteria of physical properties except the thermal contraction percentage.

COMPARATIVE EXAMPLE 2

A polyamide resin (AMILAN CM-6041, a copolymer of Nylon-6 and Nylon-66, produced by Toray Industries Inc.), a modified ethylene-vinyl acetate copolymer resin (NOVATEC AX-112E, produced by Mitsubishi Chemical Industries, Ltd.) and an ethylene-vinyl acetate copolymer resin (EVATATE CXV-039, produced by Sumitomo Chemical Industries, Ltd.) were extruded, in the same manner as in Example 1, by the use of a triple layer circular die to obtain a laminated, non-stretched tube having a polyamide resin layer, a modified ethylene-vinyl acetate resin layer and an ethylene-vinyl acetate layer which were arranged in that order from the outermost to innermost side. The tube was then stretched at a rate of about 300% in both longitudinal and transverse directions by the conventional bi-axial inflation method and, thereafter, heat treated to obtain a chilled beef packaging film composed of three layers with thicknesses of, from the outermost side, 12, 8 and 10 μm, respectively.

Bony meat parts each weighing 10 kg were shrink packaged in the same manner as described in Example 1 using the thus obtained film. The resulting shrink packages were found to be poor in tightness and to form significant pools of meat juice.

The rates of thermal shrinkage of the packaging film in longitudinal and transverse directions were 27% and 32%, respectively, when measured in 90° C. hot water. The values of longitudinal and transverse thermal contraction stress in 90° C. hot water were 58 g/cm and 72 g/cm, respectively. Further, the piercing strength in 90° C. hot water was 180 g. Thus, the film satisfies all the above-specified requirements except in the thermal contraction stress.

COMPARATIVE EXAMPLE 3

A polyamide resin (AMILAN CM-6041, a copolymer of Nylon-6 and Nylon-66, produced by Toray Industries Inc.), a mixture of a modified polyethylene resin (ADMER NF-550, produced by Mitsui Petrochemical Industries, Ltd.) and a polyethylene resin (ULTZEX 2021F, straight chain low density polyethylene, produced by Mitsui Petrochemical Industries, Ltd.) and an etheylene-vinyl acetate copolymer resin (EVATATE CXV-039, produced by Sumitomo Chemical Co., Ltd.) were extruded in the same manner as in Example 1 to obtain a laminated, non-stretched tube having a polyamide resin layer, a mixed resin layer and an ethylene-vinyl acetate copolymer resin layer which were arranged in that order from the outermost to innermost side. The tube was then stretched in the same manner as in Comparative Example 2 to obtain a chilled beef packaging film composed of three layers with thicknesses of, from the outermost side, 50, 55 and 20 μm, respectively.

Bony meat parts each weighing 10 kg were shrink packaged without using any "bone guard" in the same manner as described in Example 1 using the thus obtained film. The bags were sealed along a line parallel with the transverse direction of the film. The resulting shrink packages were found to undergo breakage at the seal portion during the shrinking step even when the bags used had a sufficiently large inside diameter for making easy the insertion operation of the meat part into the bags.

The rates of thermal shrinkage of the packaging film in longitudinal and transverse directions were 23% and 19%, respectively, when measured in 90° C. hot water. The values of longitudinal and transverse thermal contraction stress in 90° C. hot water were 270 g/cm and 220 g/cm, respectively. Further, the piercing strength in 90° C. hot water was 520 g. Thus, the film satisfies all the above-specified requirements except with respect to the longitudinal thermal contraction stress.

COMPARATIVE EXAMPLE 4

A polyamide resin (AMILAN CM-6041, a copolymer of Nylon-6 and Nylon-66, produced by Toray Industries Inc.), a modified polyethylene resin (ADMER NF-550, produced by Mitsui Petrochemical Industries, Ltd.) and a polyethylene resin (ULTZEX 2021F, straight chain low density polyethylene, produced by Mitsui Petrochemical Industries, Ltd.) were extruded in the same manner as in Example 1 to obtain a laminated, non-stretched tube having a polyamide resin layer, a modified polyethylene resin layer and a polyethylene resin layer which were arranged in that order from the outermost to innermost side. The tube was then stretched in the same manner as in Comparative Example 2 to obtain a chilled beef packaging film composed of three layers with thicknesses of, from the outermost side, 8, 12 and 30 μm, respectively.

Bony meat and bone-free meat each weighing 10 kg were vacuum packaged in the same manner as described in Example 1 using the thus obtained film. The bags used had an inner diameter suitable for smoothly effecting the insertion operation. The resulting shrink packages containing the bone-free meat were found to be free of breakage and excellent in tightness. However, almost all the packages containing the bony meat were found to undergo breakage at the bone portion when bone guards were not used.

The rates of thermal shrinkage of the packaging film in longitudinal and transverse directions were 22% and 26%, respectively, when measured in 90° C. hot water. The values of longitudinal and transverse thermal contraction stress in 90° C. hot water were 112 g/cm and 125 g/cm, respectively. Further, the piercing strength in 90° C. hot water was 170 g. Thus, the film satisfies all the above-specified requirements except with respect to the piercing strength.

COMPARATIVE EXAMPLE 5

Using a commercially available composite film having a thickness of 60 μm and composed of an outermost layer of an ethylene acetate copolymer resin, an intermediate layer of a vinylidene chloride resin and an innermost layer or an ethylene-vinyl acetate resin, bony meat and bone-free meat each weighing 10 kg were vacuum packaged in the same manner as described in Example 1. The bags used had an inner diameter suitable for smoothly effecting the insertion operation. The resulting shrink packages containing the bone-free meat were found to be free of breakage and excellent in tightness. However, majority of the packages containing the bony meat were found to undergo breakage at the bone portion even when bone guards were used.

The rates of thermal shrinkage of the packaging film in longitudinal and transverse directions were 40% and 53%, respectively, when measured in 90° C. hot water. The values of longitudinal and transverse thermal contraction stress in 90° C. hot water were 104 g/cm and 198 g/cm, respectively. Further, the piercing strength in 90° C. hot water was 70 g. Thus, the film satisfies all the above-specified requirements except with respect to the piercing strength.

As appreciated from the foregoing, the above-specified conditions of a film are critical for the film to be satisfactorily usable as a chilled beef packaging film. That is, a film whose thermal contraction percentage, thermal contraction stress and piercing strength meets with the above-described criteria gives shrink packages free of breakage and excellent in tightness without resorting to bone guards. Therefore, the composite film according to the present invention contributes to simplifying the packing process and reducing costs. The film is useful for shrink packaging of foods with sharp-pointed portions, such as bony meats, crabs and lobsters.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A composite film comprising at least one oxygen-impermeable layer, and at least one heat sealable, surface layer formed of a thermoplastic resin, said film having the following physical properties:

$$C_L \geq 15$$

$$C_T \geq 15$$

$$80 \leq S_L \leq 250$$

$$80 \leq S_T \leq 250$$

$$T \geq 1.2 S_L + 60$$

$$T \geq 1.2 S_T + 60$$

wherein $C_L$ and $C_T$ represent the thermal contraction percentages of the film measured in 90° C. hot water in the longitudinal and transverse directions, respectively, $S_L$ and $S_T$ represent the thermal contraction stresses g/cm of the film measured in 90° C. hot water in the longitudinal and transverse directions, respectively, and T represents the piercing strength g of the film measured in 90° C. hot water.

2. A composite film as claimed in claim 1, wherein said at least one oxygen-impermeable layer includes a layer of a polyamide resin and/or a layer of a saponified ethylene-vinyl acetate copolymer.

3. A composite film as claimed in claim 2, wherein said polyamide resin is a copoymer of nylon-6 and nylon-66.

4. A composite film as claimed in claim 2, wherein said saponified ethylene-vinyl acetate copolymer has an ethylene content of 25–50 mol % and a degree of saponification of at least 95% based on the vinyl acetate units of the copolymer.

5. A composite film as claimed in claim 1, wherein said thermoplastic resin includes a polyethylene resin, a polypropylene resin, an ethylene-vinyl acetate copolymer resin, or a modified product thereof.

6. A composite film as claimed in claim 5, wherein said modified product is a product obtained by grafting polar groups onto the polyethylene resin, polypropylene resin or ethylene-vinyl acetate copolymer resin.

7. A composite film as claimed in claim 1, wherein said thermoplastic resin includes 90–50 weight % of a polyethylene resin having a density of 0.915 to 0.945, and 10–50 weight % of an olefinic rubber compatible with said polyethylene resin.

8. A composite film as claimed in claim 7, wherein said olefinic rubber includes an ethylene-$\alpha$-olefin random copolymer rubber having an ethylene content of 60–95 mol %.

9. A composite film as claimed in claim 8, wherein said ethylene-$\alpha$-olefin random copolymer rubber is an ethylene-propylene random copolymer rubber, an ethylene-1-butene random copolymer rubber or a mixture thereof.

* * * * *